United States Patent [19]
Daniels

[15] 3,700,957
[45] Oct. 24, 1972

[54] FLAME RETARDANT POLYESTER PLASTICIZER CONTAINING 2,2-DIBROMOMETHYLENE-1,3-PROPANEDIOL
[72] Inventor: David A. Daniels, Kendall Park, N.J.
[73] Assignee: W. R. Grace & Co., New York, N.Y.
[22] Filed: Jan. 13, 1971
[21] Appl. No.: 106,258

[52] U.S. Cl............260/31.6, 260/30.6 R, 260/75 H, 260/485 G, 260/873
[51] Int. Cl......C08f 45/38, C08g 17/06, C07c 69/34
[58] Field of Search...260/31.6, 485 G, 485 H, 475 P

[56] References Cited

UNITED STATES PATENTS

| | | |
|---|---|---|
| 3,028,352 | 4/1962 | Hecker.....................260/31.6 |
| 3,250,738 | 5/1966 | Isaacs.......................260/31.6 |
| 3,048,608 | 8/1962 | Girard...................260/485 G |
| 3,501,554 | 3/1970 | Aylesworth...............260/31.6 |

Primary Examiner—Morris Liebman
Assistant Examiner—P. R. Michl
Attorney—Kenneth E. Prince

[57] ABSTRACT

Disclosed herein are novel compositions of matter having both flame-retarding and plasticizing properties and have the following mole percent compositions:

| | |
|---|---|
| dicarboxylic acids | 20 to 50 |
| glycol | 5 to 25 |
| 2,2-dibromomethyl-1,3 propanediol | 5 to 25 |
| terminating agent | 0 to 40 |
| alkyl phosphite | 0 to 10 |

6 Claims, No Drawings

FLAME RETARDANT POLYESTER PLASTICIZER CONTAINING 2,2-DIBROMOMETHYLENE-1,3-PROPANEDIOL

BACKGROUND OF THE INVENTION

This invention is a flame-retardant plasticizer which is particularly adaptable to being incorporated in synthetic resin compositions.

Many synthetic resins, especially hydrocarbon resins such as polyethylene, polystyrene, polypropylene, polyvinyl acetate, and polyvinyl chloride, have a tendency to burn in air as is noticeable when the resins are used in the expanded form, such as foamed polyvinyl chloride. Attempts have been made to reduce this tendency by adding a flame-retardant agent to the resin in order to give it flame-retardant properties. Halogen-containing compounds have been used but with little success as it was found that many of these compounds that would otherwise be good flame-retarding agents also adversely affected the other properties of the resin. More particularly, it has been extremely difficult to produce a foamed polystyrene containing a bromine flame-retardant agent. Attempts to produce such a product have resulted in a distorted or unstable foamed material.

The use of plastics having flame retardant properties is quite desirable when the plastics are used in building construction, manufactured plastics for use as decorative and functional objects, and the like.

Flame retardant means that after a specimen of treated material has been ignited, the rate of burning is slower than the rate of burning of specimen of untreated material. The flame retardant characteristic of plastics is often determined by ASTM D 568–61. In this test the specimen is exposed to the tip of a flame until ignited, but not longer than 15 seconds. If ignition has not occurred, the material is labeled "nonburning." If the material ignites, but is extinguished by its own properties it is reported as being "self-extinguishing." If, however, the material ignites, and continues to burn, the burning rate in square inches per minute is calculated.

We have found that after the flame which causes the burning is removed from a specimen consisting essentially of a polymer such as polyvinyl chloride, polystyrene, polyvinyl acetate, polybutadiene, copolymers thereof, foams thereof, or the like plasticized with the plasticizer of this invention, the specimen ceases to burn and the characteristic of ceasing to burn is denoted self-extinguishing.

It is therefore an object of this invention to provide novel flame retardant plasticizers. It is a further object of this invention to provide a novel flame retardant plasticizer which can be employed in plastics without affecting the properties of the plastic. It is a further object of this invention to provide a novel flame retardant plasticizer containing a bromide. These and other objects will be obvious to those skilled in the art as the description of this invention proceeds.

DESCRIPTION OF THE INVENTION

The above and other objects are attained by incorporating 2,2-dibromomethyl-1,3-propane diol into a plasticizer which can then be incorporated into the synthetic resin. The amount of 2,2-dibromomethyl-1,3-propane diol which is used varies from 5 to 25 mole percent of the plasticizer. The amount of plasticizer which is used in the synthetic resin is 25 to 40 percent of the total composition, preferably about 35 percent.

To prepare the plasticizer a dicarboxylic acid having four to 12 carbon atoms, preferably six to 10 carbon atoms, a glycol having two to eight carbon atoms, preferably two to six carbon atoms, and 2,2-dibromomethyl-1,3-propane diol having the following formula

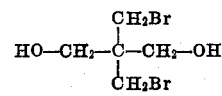

are admixed and then esterified. Other components which may be included in the plasticizer are small amounts of a dialkyl hydrogen phosphite, e.g., dimethyl hydrogen phosphite and diphenyl hydrogen phosphite which are color supresants and also produce a synergistic effect with the 2,2-dibromoethyl-1,3-propane diol as hereafter explained, and a chain terminating agent, e.g., any monohydric alcohol having 1–14 preferably 4–13 carbon atoms, or monobasic acid preferably having 4–10 carbon atoms. For purposes of this specification and claims, a terminating agent is an alcohol or organic acid having properties which enable it to terminate the growth of the plasticizer chain. The amounts of each of the components used to prepare the preferred plasticizer in mole percents are as follows:

| | |
|---|---|
| dicarboxylic acid | 20–50 |
| glycol | 5–25 |
| 2,2-dibromomethyl-1,3 propane | 5–25 |
| terminating agent | 0–40 |
| alkyl phosphite | 0–10 | such that the total mole percent of the components equals 100.

Having thus formed the plasticizer, it can then be incorporated into a plastic such as polyvinyl chloride, polystyrene or various foams such as foamed polystyrene, etc.

The amount of the thus prepared plasticizer that is then admixed with the chosen plastic (polymer) can range from 20–120 parts by weight plasticizer to 100 parts by weight plastic, although the range in parts by weight of plasticizer to plastic is preferably about 40–80:100.

Any dicarboxylic acid which is characterized by having 4 to 12 carbon atoms is operable in this invention. We do however, prefer to use those dicarboxylic acids having six to 10 carbon atoms, e.g. adipic, pimelic, suberic, azelaric, sebacic, and the aromatic dicarboxylic acids having 6–10 carbon atoms.

The glycol which is used in our plasticizer is characterized by having 2–8 carbon atoms, and more preferably, 2–6 carbon atoms, e.g. ethylene glycol, propylene glycol, the butane glycols, the pentane glycols, the hexane glycols, diethylene glycol and dipropylene glycol.

Surprisingly, we have found that 2,2-dibromomethyl-1,3-propane diol is effective as a flame-retarding agent when incorporated into the plasticizer and is also easily processable with the polymers into which it is to be incorporated. This is surprising because other brominated glycols such as 2,3-dibromo-1,3-propane diol and 3-bromo-1,3-propane diol are not processable, but rather are very unstable when incorporated into polymers and also give discolored products. The use of this particular brominated glycol, 2,2-dibromo-1,3 propane diol is therefore critical to this invention.

We have also found that the addition of a small amount of an alkyl hydrogen phosphite is also effective in adding to the flame-retarding qualities of the 2,2-dibromomethyl-1,3-propane diol. In fact, there is a synergistic effect between the 2,2-dibromomethyl-1,3propane diol and the phosphite.

It has been found that if an alkyl phosphite and no 2,2-dibromomethyl-1,3 propane diol is present is the plasticizer, the plasticizer is not "flame-retardant" until it contains at least about 10 mole percent of the alkyl phosphite. The alkyl phosphites are, however, quite expensive and the use of 10 mole percent is not economically desirable. However if only 1 mole percent of the alkyl phosphite and 5 mole percent of the 2,2-dibromomethyl-1,3 propane diol are incorporated into the plasticizer, it then becomes flame-retardant whereas if less than 1 percent of the alkyl phosphite or less than 5 mole percent of the 2,2-dibromomethyl-1,3 propane diol are used alone, the plasticizer is not flame-retardant. Although the mechanism of this phenomena is not entirely understood, the flame-retardant qualities of a plasticizer containing said glycol and said phosphite are superior to compositions wherein only said phosphite is used. Although any alkyl hydrogen phosphite is operable we have chosen to use dimethyl hydrogen phosphite because of its availability and handling ease.

It is often desirable to terminate the building of the plasticizer chain; to do this, I prefer to add, to the components of the plasticizer already mentioned, what is commonly called a "chain terminator." The chain terminator may be an alkanoic acid or an alkanol. We have found that due to their low cost, 2-ethylhexanol and isodecyl alcohol are quite convenient. When preparing the flame-retardant plasticizer of this invention the components, e.g., 20–50 mole percent of a dicarboxylic acid having 2–12 carbon atoms, 5–25 mole percent of a glycol having 2–8 carbon atoms and 5–25 mole percent of 2,2-dibromomethyl-1,3 propane diol and a chain terminator and/or alkyl phosphite as herein explained, all to total 100 mole of percent, are admixed and esterified with simultaneous removal of by-product water, followed by cooling, and subsequent removal of any non-esterified material and impurities by any convenient method. Esterification is conducted by heating the admixture to a temperature between ambient and 220° C. at a pressure and for a time period to substantially complete esterification. The exact esterification process is not critical to the invention and any convenient method of esterification is operable.

As is the common practice in the art, when incorporating the flame-retardant polyester plasticizer of this invention into the synthetic resin, e.g. polyvinyl chloride, small amounts of a stabilizer and lubricant are also added.

The following examples will aid in explaining the invention but are not intended as limitations thereof.

EXAMPLE 1

730 grams (2.0 moles) adipic acid, 364 grams (1.40 mole) neopentyl glycol, 221 grams (0.36 mole) dibromo neopentyl glycol, 9 grams (0.03 mole) dimethyl hydrogen phosphite, and 143 g (0.44 mole) of 2-ethylhexanol were admixed under a nitrogen atmosphere in a 3-neck flask. The water of esterification was removed as formed the temperature being increased from ambient to a maximum of 220° C. during a 16 hour period. The pressure was then maintained at 50 mm of mercury for 1 more hour and the reaction mixture was then cooled and filtered at 130°C. The material was found to have a bromine content of 9.4 percent.

EXAMPLE 2

A plasticizer was prepared by admixing 731 grams (2.0 moles) adipic acid, 339 grams (1.30 moles) neopentyl glycol, and 307 grams (0.50 mole) dibromo neopentyl glycol, 11.0 g (0.04 mole) of dimethyl hydrogen phosphite and 143 g (0.44 mole) of 2-ethylhexanol in a 3-neck flask under nitrogen atmosphere for a period of 20 hours. The water of esterification was removed as formed. The temperature was gradually increased from ambient to 220°C. Over a 20 hour period. The pressure was then maintained at 50 mm Hg for 6 more hours at 220°C. and the plasticizer was found to have a bromine content of 13.1 percent.

EXAMPLES 3 & 4

Example 1 was repeated except that the dibromo neopentyl glycol was replaced by 2,3-dibromo-1,3 propane diol (Example 3) and 3-bromo-1,3 propane diol (Example 4).

EXAMPLE 5

This example illustrates the benefit of using the flame-retardant plasticizer of this invention as compared with two well-known flame-retardants, dioctyl phthalate and tricresyl phosphate.

The following compositions were used to prepare flame-retardant plasticized polyvinyl chloride.

SAMPLE NO.

| Component (Parts by Weight) | I dioctyl phthalate | II tricresyl phosphate | III Flame-retardant plasticizer of this invention |
|---|---|---|---|
| Polyvinyl chloride | 100 | 100 | 100 |
| Dioctyl phthalate | 58 | — | — |
| Tricresyl phosphate | — | 58 | — |
| Flame-retardant plasticizer (as prepared in Example 2) | — | — | 58 |
| Stabilizer[a] | 3 | 3 | 3 |
| Lubricant[b] | 0.5 | 0.5 | 0.5 |

[a] Ferro 5002, the barium and cadmium salts of a fatty acid, commercially available from Ferro Corp.
[b] Stearic acid, a well-known lubricant used by those skilled in the art when preparing a plasticized plastic.

The samples were milled at 320°F. until homogeneous. They were then formed into sheets at 300°F. and 30,000 psi for 5 minutes and allowed to cool under pressure. The sheets measured 18 inches by 8 inches, by 50 mils. Each sheet was cut into strips measuring 8 inches by 1 inch by 50 mils for testing by ASTM D568–61 as heretofore described.

The results were as follows:

Example I (dioctyl phenyl phthalate):

The strips were completely consumed each time, in 18 seconds (average of four runs) and dripped onto the floor of the hood and continued to burn.

Example II (tricresyl phosphate):

These strips became deformed and melted and dripped onto the floor of the hood as long as the flame was applied but would not support combustion.

Example III ("Flame-retardant plasticizer"):

The strip ignited when subjected to flame and the surface scorched and burned sporadically for 10–12 seconds after the flame was removed. The burned area was 3–4 inches long. When the surface burning stopped (self extinguishing), the strip could not be reignited. This material did not drip as the other two samples did.

EXAMPLES 6 & 7

Attempts were made to incorporate the plasticizer of Example 3 (Example 6) and the plasticizer of Example 4 (Example 7) into polyvinyl chloride. However, in neither Example 6 nor Example 7 was the plasticizer processable with the polyvinyl chloride. In addition to being non-processable, the plasticizer discolored the polyvinyl chloride.

EXAMPLE 8

Example 1 was repeated with similar results except that the terminating agent (2-ethylhexanol) was not included in the composition. The thus prepared composition was then subjected to ASTM D 568–61 as in Example 5 with substantially similar results.

EXAMPLE 9

Example 1 was repeated with similar results except that the phosphite (dimethyl hydrogen phosphite) was not included in the composition. Thus prepared composition was then subjected to ASTM 568-61 as in Example 5 with substantially similar results.

EXAMPLE 10

Example 1 was repeated with substantially similar results except that neither the phosphite (dimethyl hydrogen phosphite nor terminating agent (2-ethylhexanol) were used. The thus prepared composition was then subjected to ASTM 568–61 as in Example 5 with substantially similar results.

What is claimed is:

1. A homogeneous composition of matter comprising 100 parts by weight of a resin selected from the group consisting of polyvinyl chloride, polyvinyl acetate, and polystyrene and 20-120 parts by weight of a flame-retardant polyester plasticizer wherein said flame-retardant plasticizer is prepared by the following sequential steps:

a. forming a mixture by admixing 20–50 mole percent of a dicarboxylic acid selected from a first group consisting of adipic acid, pimelic acid, suberic acid, azelaic acid, and sebacic acid, 5–25 mole percent of a glycol selected from a second group consisting of ethylene glycol, propylene glycol, neopentyl glycol, 2,2,4-trimethylpentane glycol, a butylene glycol, a pentylene glycol, hexylene glycol, diethylene glycol, and dipropylene glycol, 5-25 mole percent of 2,2-dibromomethylene-1,3-propanediol, and a quantity of a chain terminator selected from the group consisting of 2-ethylhexanol and isodecyl alcohol to total 100 mole percent;

b. esterifying the mixture and simultaneously removing the esterification by-product water to form said flame-retardant polyester plasticizer; and c. cooling and recovering the flame-retardant polyester plasticizer; the resulting homogeneous composition of matter having flame retardant properties.

2. The homogeneous composition of claim 1 in which the second group member is neopentyl glycol, ethylene glycol, 1,4-butanediol, 1,3 butanediol, propylene glycol, 2,2,4 trimethylpentane glycol, or dipropylene glycol.

3. A homogeneous composition of matter comprising 100 parts by weight of a resin selected from the group consisting of polyvinyl chloride, polyvinyl acetate, and polystyrene and 20–120 parts by weight of a flame-retardant polyester plasticizer wherein said flame-retardant plasticizer is prepared by the following sequential steps:

a. forming a mixture by admixing 20–50 mole percent of a dicarboxylic acid selected from the group consisting of adipic acid, pimelic acid, suberic acid, azelaic acid, and sobacic acid, 5–25 mole percent of a glycol selected from a second group consisting of ethylene glycol, propylene glycol, neopenthyl glycol, 2,2,4-trimethylpentane glycol, a butylene glycol, a pentylene glycol, a hexylene glycol, diethylene glycol, and dipropylene glycol, 5–25 mole percent of 2,2-dibromomethylene-1,3-propanediol, 1–10 mole percent of a dialkyl hydrogen phosphite, and a quantity of a chain terminator selected from the group consisting of 2-ethylhexanol and isodecyl alcohol to total 100 mole percent;

b. esterifying the mixture and simultaneously removing the esterification by-product water to form said flame-retardant polyester plasticizer; and c. cooling and recovering the flame-retardant polyester plasticizer; the resulting homogeneous composition of matter having flame retardant properties.

4. The homogeneous composition of claim 3 in which the second group member is neopentyl glycol, ethylene glycol, 1,4-butanediol, 1,3 butanediol, propylene glycol, 2,2,4 trimethylpentane glycol, or dipropylene glycol.

5. The homogeneous composition of claim 3 in which the dialkyl hydrogen phosphite's concentration is 1 mole percent.

6. The homogeneous composition of claim 3 in which the dialkyl hydrogen phosphite is dimethyl hydrogen phosphite.

* * * * *